(12) United States Patent
Matsumoto et al.

(10) Patent No.: US 6,349,745 B1
(45) Date of Patent: Feb. 26, 2002

(54) PLUG

(75) Inventors: Junji Matsumoto; Shigeaki Oda, both of Shizuoka-ken (JP)

(73) Assignee: Kabushiki Kaisha Atsumitec, Shizuoka-ken (JP)

( * ) Notice: Subject to any disclaimer, the term of this patent is extended or adjusted under 35 U.S.C. 154(b) by 0 days.

(21) Appl. No.: 09/662,297

(22) Filed: Sep. 15, 2000

(30) Foreign Application Priority Data

Sep. 27, 1999 (JP) .............................. 11-272719

(51) Int. Cl.⁷ ................................ F16L 55/10
(52) U.S. Cl. ........................ 138/89; 138/96 R
(58) Field of Search ................. 138/89, 96 R, 138/96 T

(56) References Cited

U.S. PATENT DOCUMENTS 2,416,829 A * 3/1947 Hartley ..................... 138/89
2,975,947 A * 3/1961 Pellett ...................... 138/89 X
5,048,571 A * 9/1991 Ellis ......................... 138/89 X

OTHER PUBLICATIONS

Parts List for Honda Inspire Saber; Sep. 10, 2000; 3 pages.

* cited by examiner

*Primary Examiner*—Patrick Brinson
(74) *Attorney, Agent, or Firm*—Harness, Dickey & Pierce, P.L.C.

(57) ABSTRACT

A plug comprising a cover portion for covering an opening of an aperture; elastically deflectable legs extending from the under side of the cover portion; and anchoring nails laterally projecting from the legs for engaging the edge of the aperture characterized in that each of the legs is provided with at least one projections laterally extending therefrom in same direction as that of the anchoring nail formed on the corresponding leg beyond the tip of the anchoring nail.

4 Claims, 7 Drawing Sheets

(a)

(b)

PLUG

BACKGROUND OF THE INVENTION

1. Field of the Invention

The present invention relates to a plug for closing an aperture, and more particularly to a blind plug for closing an aperture which is not used in normal case and formed in structural members of articles such as automobiles, electronic instruments and the like.

2. Description of Background Art

Recently, a shift lock mechanism for preventing the unintentional start of a vehicle owing to an erroneous operation of an automatic transmission controller of an automatic transmission. The shift lock system is intended to prevent a driver from doing the shifting operation from the "P" (parking) position without depressing the brake pedal on start in order to cope with the erroneous operation between the brake pedal and the accelerator pedal.

There is a key interlock mechanism (so-called a shift lock apparatus with key inter lock) adopted as an erroneous operation preventing apparatus in relation to the shift lock mechanism. The key interlock mechanism is structured so that it prevents the shift lever of the automatic transmission during parking at "P" position and that it prevents the ignition key from being pulled out without shifting the shift lever to the "P" position.

For adopting the mechanisms mentioned above, there is provided within the automatic transmission controller a solenoid for limit the operation of the shift lever. The operation of the shift lever from the "P" position is limited corresponding to the positions of the brake pedal and the ignition key due to an electrical connection between the solenoid and the brake pedal.

In such a shift lock apparatus, there is provided a mechanism for forcedly manually releasing the shift lock that is used in a occasion which would be happened for example in the electric circuit (for example exhaustion of battery charge). The manual releasing mechanism has an aperture formed for example in a decoration panel of the automatic transmission controller for receiving the ignition key used as a releasing means.

In view of prevention of crime as well as aesthetics, the aperture is normally covered or closed by a blind cover (hereinafter referred to as a "plug") with the plug being inserted in the aperture. The plug of the prior art has two legs extending from the underside of a cover portion having a substantially same configuration of the opening of the aperture. One anchoring nail is formed on each leg projecting outward therefrom so as to be able to engage the peripheral edge of the opening of the aperture formed in the decoration panel of the automatic transmission controller.

When any trouble would be happened for example in the electric circuit of the shift lock apparatus and thus the manual release of the shift lock is desired, it can be achieved by removing the plug from the decoration panel with using a suitable removing tool such as a screw driver and then inserting the ignition key into the aperture.

However, a conventional plug has a defect such that it is liable to suddenly spring out from the aperture when removing the plug therefrom. The plug sprung out from the aperture is sometimes lost or hits a face or an eye of a worker. This is because that there is only one anchoring nail is provided on each leg of the plug and no means is provided on the conventional plug for preventing its spring out from the aperture.

SUMMARY OF THE INVENTION

It is, therefore, an object of the present invention to provide a plug which can prevent it from unintentionally spring out from an aperture when being removed therefrom and from being lost as well as can improve the safety of a worker.

For achieving the object of the present invention, there is provided according to the present invention a plug comprising a cover portion for covering an opening of an aperture; elastically deflectable legs extending from the under side of the cover portion; and anchoring nails laterally projecting from the legs for engaging the edge of the aperture characterized in that each of the legs is provided with at least one projections laterally extending therefrom in same direction as that of the anchoring nail at a position nearer the tip of the leg than that of the anchoring nail.

According to the invention of claim 1, when a worker pulls the cover portion of the plug out from the aperture in order to remove the plug therefrom, it is possible to prevent the plug from spring out from the aperture due to the engagement of the projection formed on the leg of the plug with the edge of the aperture and also possible to turn the removal direction laterally so as to prevent the plug from hitting the face especially an eye of the worker.

According to the invention of claim 2, the projection can be engaged with the edge of the aperture after the anchoring nails having been released from the engagement with the edge of the aperture.

According to the invention of claim 3, it is possible to make the engagement of projection with the edge of the aperture more easy and thus to make the plug to more firmly change the removing direction of the plug laterally.

According to the invention of claim 4, it is possible to normally close the aperture formed in the decoration cover of the automatic transmission controller in manner superior in view of prevention of crime as well as aesthetics.

BRIEF DESCRIPTION OF THE DRAWINGS

One preferred embodiment of the present invention will be described with reference to the accompanied drawings in which;

FIG. 1(*b*) is a cross-sectional view taken along a line A—A;

DESCRIPTION OF THE PREFERRED EMBODIMENTS

Figure 6:
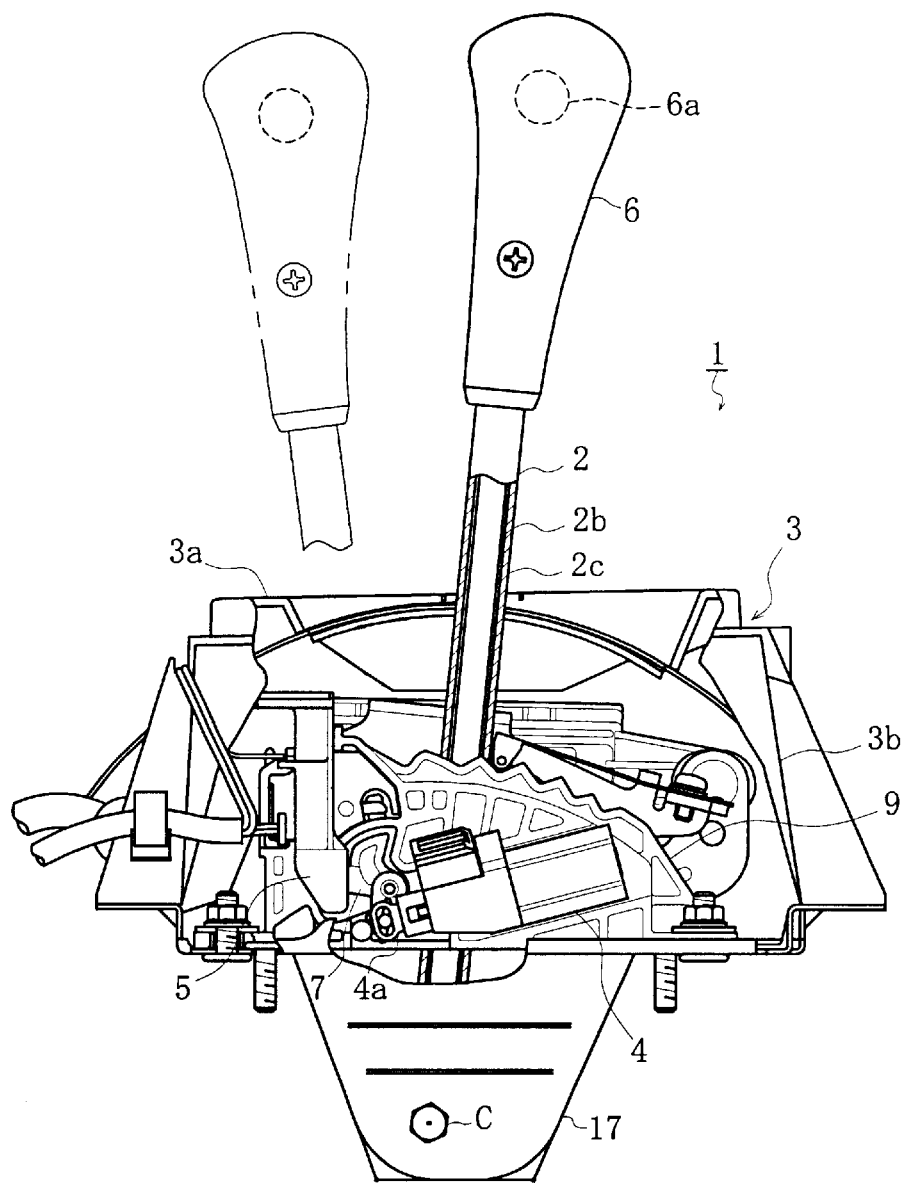
FIG. 6 is a partially cross-sectional view of the automatic transmission controller to which the plug of the invention applied.

FIG. 6 is a partially cross-sectional view of an automatic transmission controller 1 to which a plug of the present invention is applied. The automatic transmission controller 1 mainly comprises a shift lever 2, a housing 3 containing a swing mechanism of the shift lever 2, and shift lock apparatus (including a solenoid 4 and manual release mechanism 5) contained in the housing 3.

Figure 7:
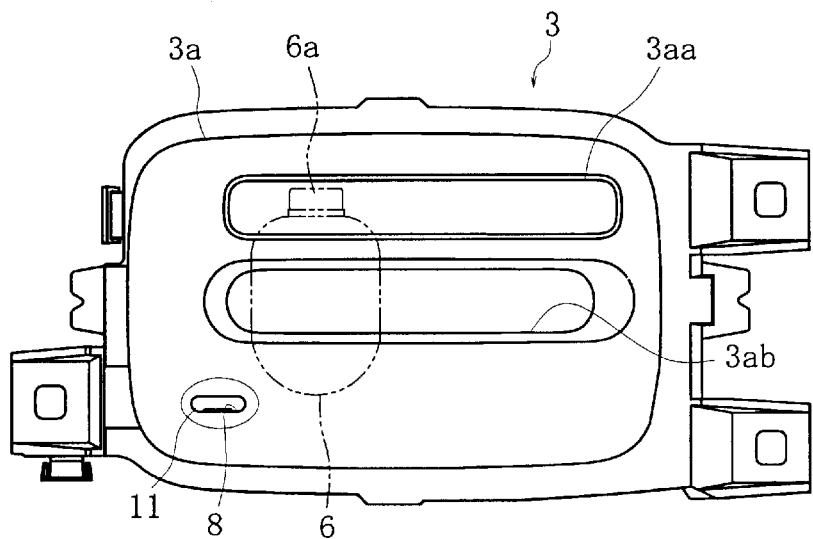
FIG. 7 is a plan view of the automatic transmission controller of FIG. 6.
Figure 8:
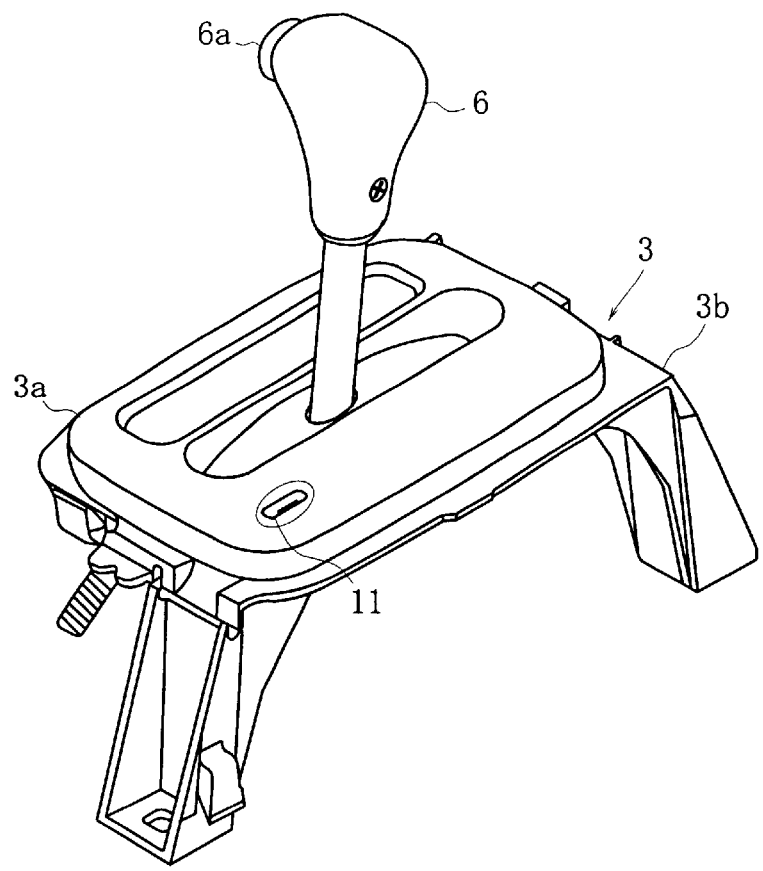
FIG. 8 is a perspective view of the automatic transmission controller of FIG. 6.

The housing 3 forms a box of the automatic transmission controller 1 comprising a decoration panel 3a, and a console portion 3b having a bracket to be secured to a base bracket 17 mounted on a body of a vehicle. As shown in FIGS. 7 and 8, the decoration panel 3a is formed with a shift range indicator 3aa, a slit 3ab for slidably receiving the shift lever 2, and an aperture 8 for receiving an ignition key when any trouble would be happened. The aperture is adapted to be inserted and closed by a plug in a manner hereinafter described in detail.

The shift lever 2 can be swung around a pivot pin C and has a shift knob 6 on the distal end thereof. The shift lever has a hollow shaft 2c in which a detent rod 2b is slidably contained. The detent rod 2b is normally urged upward by a spring (not shown) and can be lowered within the hollow shaft 2c against the urging force when a release button 6a arranged on the shift knob 6 is pushed.

Figure 10:
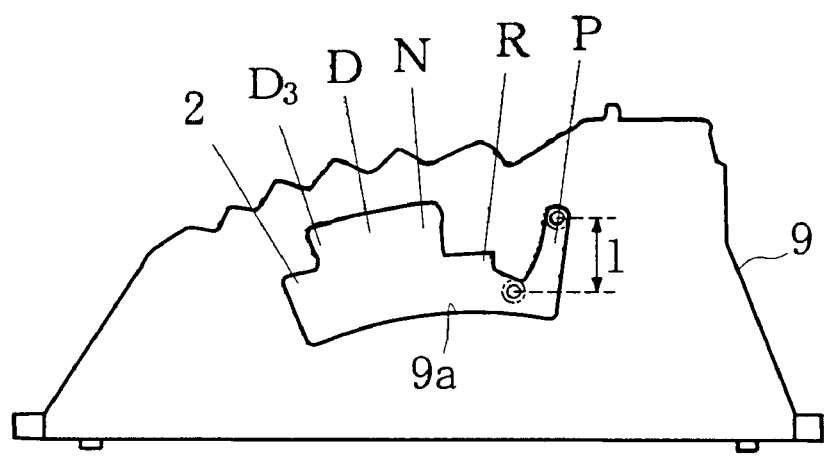
FIG. 10 is a side-elevational view of a detent plate arranged within the automatic transmission controller.

A detent pin 2a projects from the side of the detent rod 2b toward a detent plate 9 and is moved vertically by the detent rod 2b. The detent plate 9 is formed with a recess 9a corresponding to the shift ranges of the transmission as shown in FIG. 10 and has a function for preventing the swing of the shift lever 2 from the "P" range to the "R" range without lowering the detent pin 2a by a predetermined distance "I" by pushing the release button 6a.

The shift lock apparatus is adapted to prevent unintentional start of a vehicle due to an erroneous operation of the automatic transmission controller 1 and thus is constructed so that the shift change cannot be carried out without the ignition key being inserted in the key cylinder as wall as the brake pedal being depressed when the shift lever 2 is positioned at the "P" (parking) range.

That is, a limiting member 7 is arranged for preventing the detent pin 2a from being lowered by the distance "I" within the recess 9a of the detent plate 9 when the shift lever 2 is positioned at the "P" range. The limiting member 7 allows the lowering motion of the detent pin 2a by the predetermined distance "I" by being pivoted toward an arrow "a" by a rotation of an operating arm 4a retracting from a position of FIG. 6 (toward a direction of an arrow "b" in FIG. 9) due to actuation of the solenoid 4 when the insert of the ignition key into the key cylinder, the positioning of the shift lever 2 at the "P" range as well as the depression of the brake pedal are detected.

The limiting member 7 has an upper end for limiting the lowering motion of the detent pin 2a and a pin mounted on the lower end thereof for engaging with the operating arm 4a. The left end of the limiting member 7 is adapted to be engaged with a manual release means 5 hereinafter described. Due to the structure, the limiting member 7 is rotated toward the arrow "a" around a pivot pin C1 by the lowering motion of the manual releasing means 5 in addition to the retracting motion of the operating arm 4a of the solenoid.

The automatic transmission controller further has means for manually release the shift lock when the actuation of the solenoid is failed by any trouble.

Figure 9:
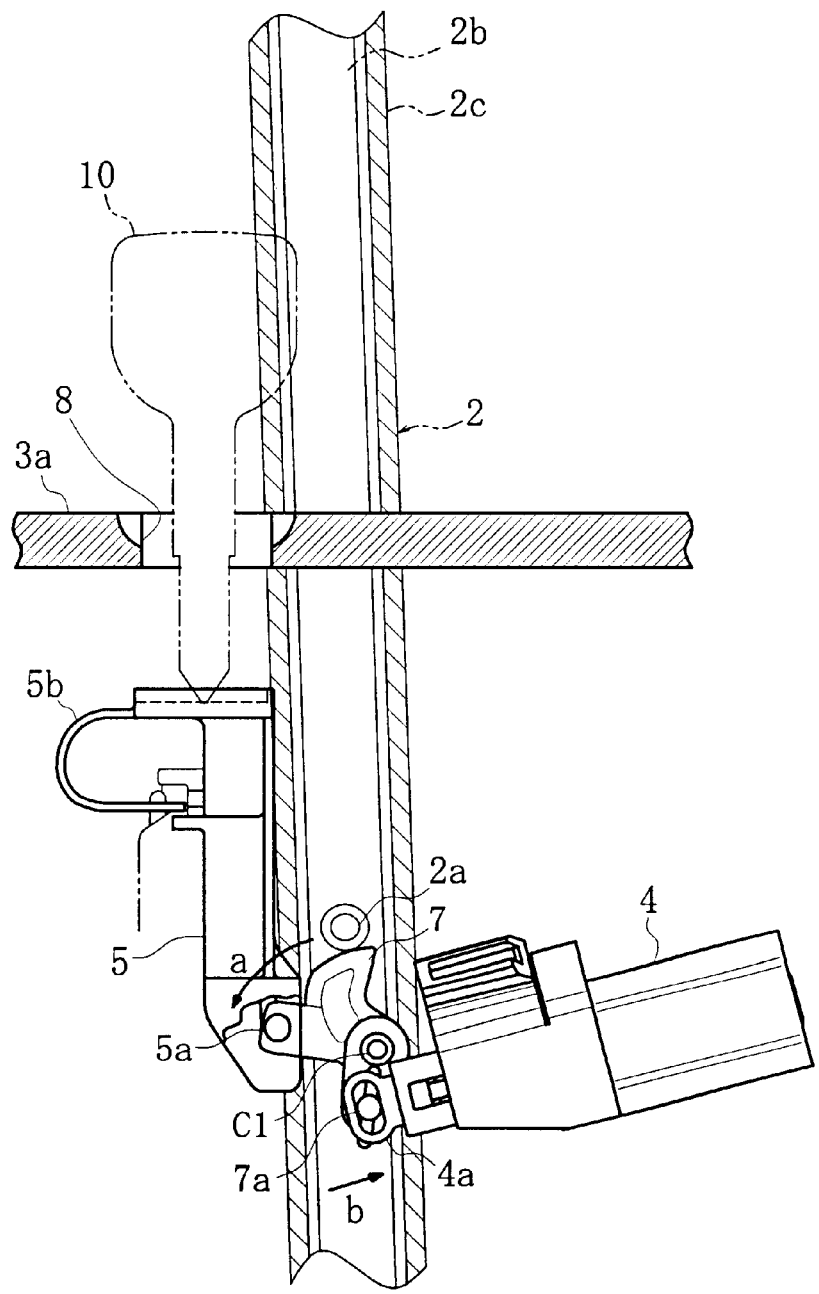
FIG. 9 is a schematic view showing the shift lock mechanism arranged within the automatic transmission controller.

That is, as shown in FIG. 9, the shift lock can be released by inserting the ignition key 10 into the aperture 8 leading to the manual releasing means 5 from the upper surface of the decoration panel 3a and then by lowering the manual releasing means 5 in order to rotate the limiting member 7 toward the direction "a". The manual releasing means 5 can be returned to its original position by a return spring 5b arranged at the top of the manual releasing means 5 after the ignition key 10 having been pulled out from the aperture 8.

Figure 1:
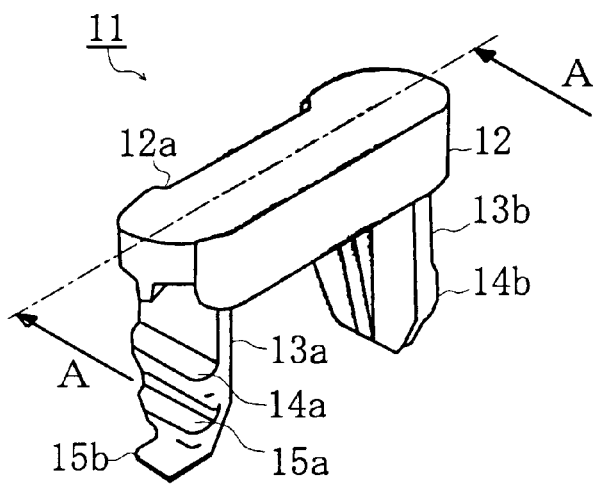
FIG. 1(*a*) is a perspective view of the plug of the present invention.
Figure 1:
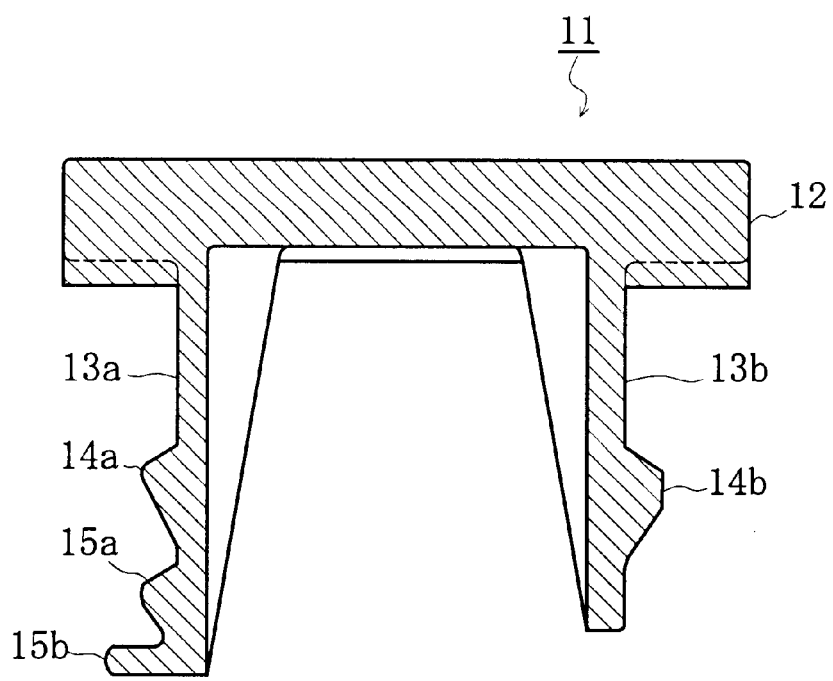

As shown in FIGS. 1(a) and 1(b), the plug 11 of the present invention comprises a cover portion 12, two legs 13a and 13b, anchoring nails 14a and 14b, and projections 15a and 15b. These elements are made of plastic and formed integrally.

The cover portion 12 formed as substantially same configuration as that of the opening of the aperture 8 so as to be able to closely fitted within the opening of the aperture 8 when the plug 11 is inserted in the aperture 8. One side of the cover portion 12 is recessed to form a notch 12a allowing reception of a tip of a suitable tool such as a screw driver when removing the plug 11 from the aperture (see FIG. 4).

Figure 2:
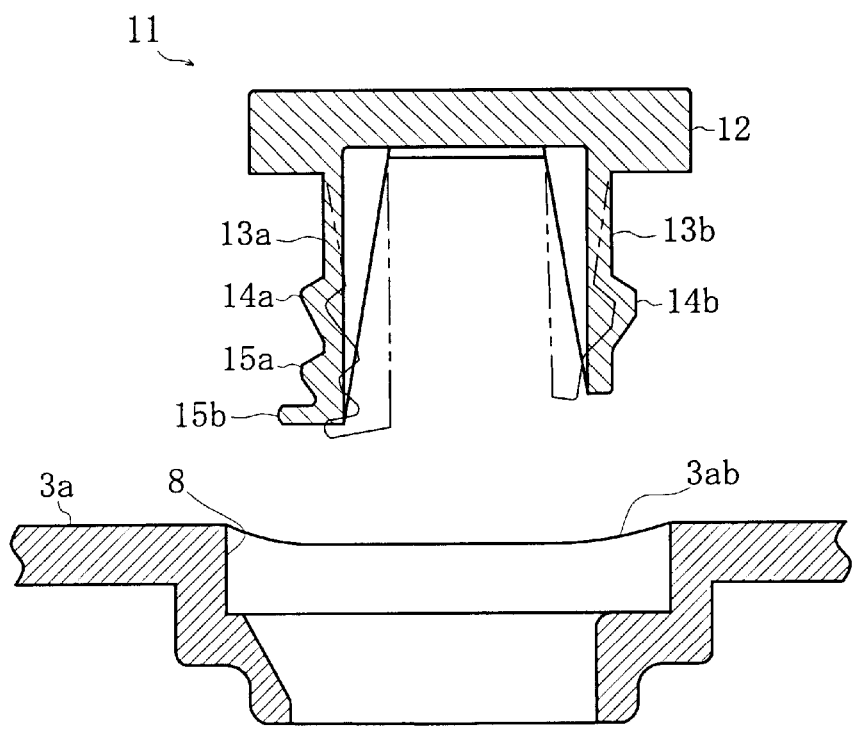
FIG. 2 is a cross-sectional view showing a condition of a plug of the present invention prior to it being mounted in an aperture of a decoration panel of the automatic transmission controller.

The legs 13a and 13b extend downward from the underside of the cover portion 12 with spaced from each other at a predetermined distance and are elastically deflected as shown by dotted lines in FIG. 2. A numeral 3ab denotes a recess formed in the decoration panel 3a around the aperture 8.

Figure 3:
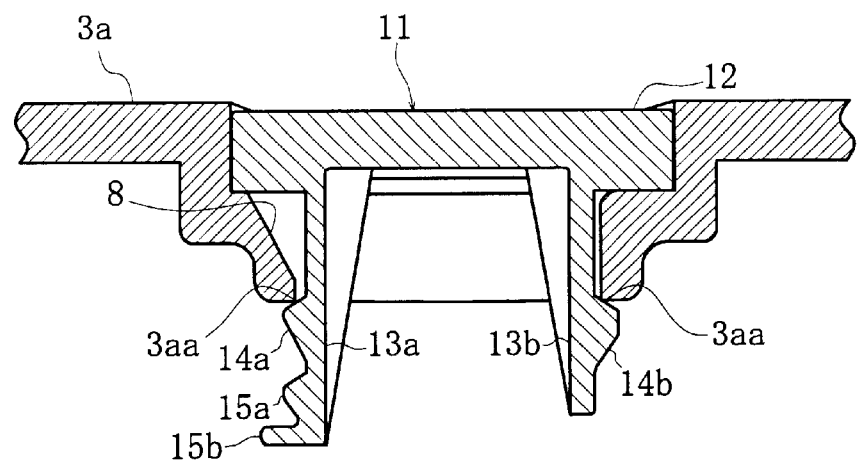
FIG. 3 is a cross-sectional view showing a condition of the plug of the present invention mounted in the aperture of the decoration panel of the automatic transmission controller.

One leg 13b is formed with an anchoring nail 14b projecting from the leg 13b and the other leg 13a is formed with an anchoring nail 14a and projections 15a and 15b. As shown in FIG. 3, the anchoring nails 14a and 14b engage a peripheral edge 3aa of the aperture 8 of the decoration panel 3a and secure the plug 11 in position when the plug 11 is fully inserted in the aperture 8.

Figure 4:
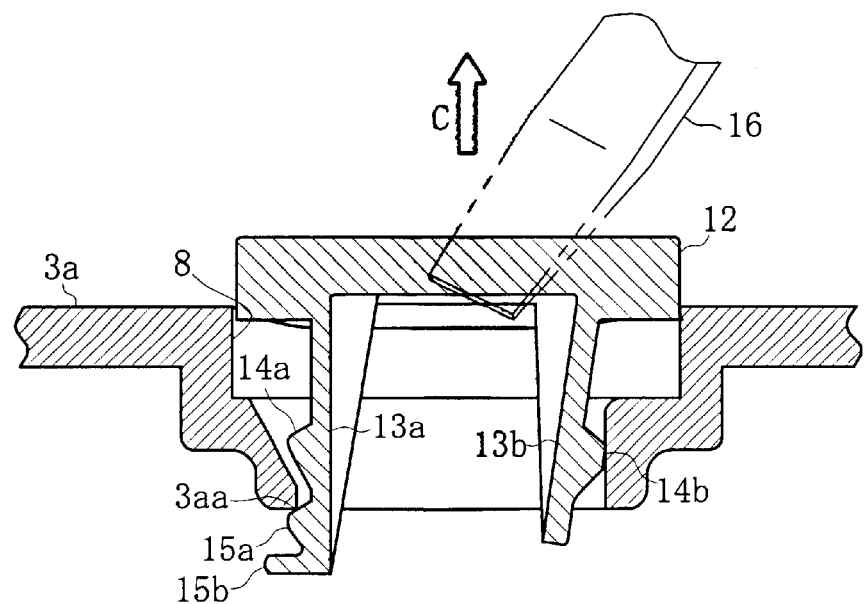
FIG. 4 is a cross-sectional view showing a condition of the plug of the present invention partially removed from the aperture of the decoration panel of the automatic transmission controller.

In order to remove the plug 11 closing the aperture 8 as shown in FIG. 3, the tip of any tool such as a screw driver is inserted in the notch 12a and lift the plug 11 with a lever action as shown in FIG. 4.

When the plug 11 is lifted, the legs 13a and 13b are elastically deflected inward each other by a projecting height of the anchoring nails 14a and 14b. During this lifting operation, the plug 11 are liable to spring out from the aperture 8 due to the spring forces caused by the deflection of the legs 13a and 13b. During which, however, the projection 15a engages the peripheral edge of the aperture 8 as shown in FIG. 4 and thus keeps the plug 11 in this position. After this, the plug 11 can be pulled out by fingers.

Accordingly, the worker can know that the anchoring nails 14a and 14b are disengaged from the peripheral edge of the aperture 8 and therefore it is possible to prevent the plug 11 from spring out the aperture 8 as well as the plug from hitting a face of the worker.

Figure 5:
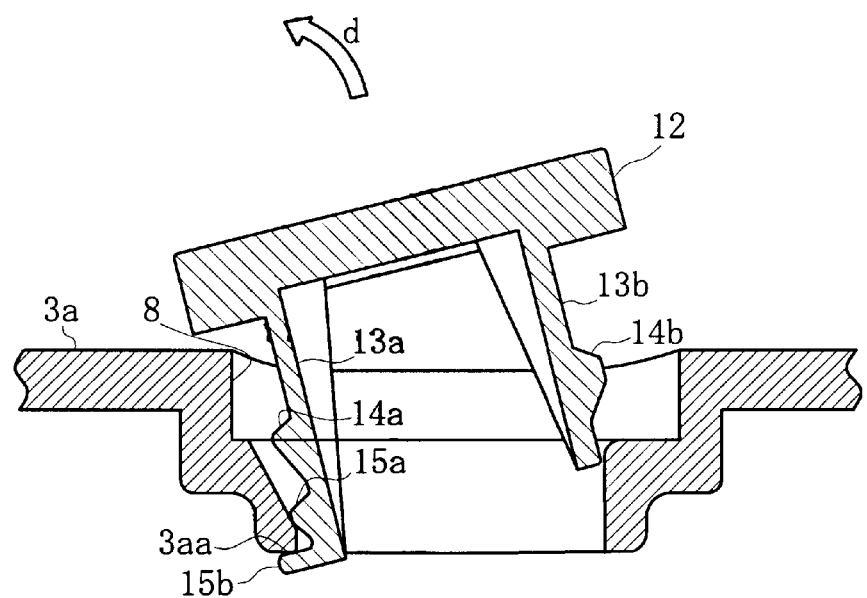
FIG. 5 is a cross-sectional view showing a condition of the plug of the present invention further removed from the aperture of the decoration panel of the automatic transmission controller.

Formed below the projection 15a is an another projection 15b extending in a same direction as that of the anchoring nail 14a and the projection 15a. Since this projection 15b is formed beyond a large amount the tips of the anchoring nail 14a and the projection 15a, the projection 15b can firmly engage the peripheral edge of the aperture 8 as shown in FIG. 5. Thus it is possible to securely prevent the spring out of the plug 11 even though the worker would strongly lift the plug 11 and also to turn the plug 11 to a direction "d" due to an abutment of the projection 15b with the peripheral edge 3aa of the aperture 8 of the decoration panel 3a.

The turning of the plug 11 toward the direction "d" can further improve the function of preventing the plug 11 from hitting a face of the worker. The amount of projecting height of the projection 15b may be substantially same as those of the anchoring nail 14a and the projection 15a. However, it is preferable to extend the projection 15b beyond a large amount the tips of the anchoring nail 14a and the projection 15a in order to securely turn the plug 11 toward the direction "d".

According to the present invention, the provision of the projections 15a and 15b enable the worker to feel that the plug 11 is ready for removal.

In addition, since the spring out of the plug 11 is prevented according to the present invention, it is possible to prevent the plug 11 from being lost.

Although the embodiment of the present invention has been illustrated and described with respect to a special example of the plug, it is to be noted that the present invention is not limited to that embodiment. For example, it is possible to provide three or more projections on one leg 13a or to provide a projection on the other leg 13b. Alternately, it is possible to provide only one projection 15b on the leg 13a (of course, the anchoring nail 14a is provided) and to omit the projection 15a.

In addition, it is possible to omit the projection 15b if the effect of turning the plug 11 is not desired. Furthermore, legs 13a and 13b may be formed separately from the cover portion 12 or only one of the legs 13a and 13b may be made of elastic material.

What is claimed is:

1. A plug for covering an opening formed in a decoration panel of an automatic transmission controller, the plug comprising:

a cover portion to close an aperture of the opening;

two elastically deflectable legs extending from the cover portion; and anchoring nails laterally projecting from the legs for engaging the decoration panel wherein each anchoring nail includes an upper surface sloping downward toward the tip of the anchoring nail and wherein only one of the legs is provided with a projection laterally extending therefrom in the same direction as that of the anchoring nail.

2. A plug of claim 1 wherein the projection is adapted to be engaged with the edge of the aperture after the anchoring nails having been released from the engagement with the edge of the aperture.

3. A plug of claim 1 where the projection is arranged at or near the tip of one leg and extends beyond the tips of the anchoring nails.

4. A plug of claim 1 wherein each anchoring nail includes a lower surface sloping upward toward the tip of the anchoring nail.

* * * * *